March 8, 1955

J. V. COOK 2,703,539

BAKING OVEN

Filed Jan. 12, 1951

INVENTOR.
JOHN V. COOK

BY Otto Moeller

Attorney

March 8, 1955  J. V. COOK  2,703,539
BAKING OVEN
Filed Jan. 12, 1951  3 Sheets-Sheet 2

INVENTOR.
JOHN V. COOK
BY
Otto Moeller
Attorney

March 8, 1955     J. V. COOK     2,703,539
BAKING OVEN

Filed Jan. 12, 1951     3 Sheets-Sheet 3

INVENTOR.
JOHN V. COOK
BY
Otto Moeller
Attorney

United States Patent Office 2,703,539
Patented Mar. 8, 1955

2,703,539

BAKING OVEN

John V. Cook, York, Pa., assignor to Read Standard Corporation, a corporation of Delaware Application January 12, 1951, Serial No. 205,714

10 Claims. (Cl. 107—55)

My invention relates to baking ovens and it has for its object the provision of a new and improved form and arrangement of parts in a device of this type for selectively controlling the oven for directly heating the products to be baked, or indirectly heating them, or partially directly and indirectly heating them.

Ovens have conventionally been of the type in which the heating gases are admitted into the baking chamber whereby baking is accomplished by exposing the products to be baked directly to the heating gases, known as a direct fired oven. Also ovens have conventionally been of the type in which the products of combustion or heating gases pass through heating tubes extending into the baking chamber, and are withdrawn without contacting the products to be baked, known as an indirect fired oven. A portion of the combustion gases may be recirculated in which case the oven is known as an indirect recirculating heat oven. It has been found from experience that direct firing affords certain advantages over indirect, permitting of a faster bake, for example, if a faster bake is desired. Indirect firing, on the other hand, affords better steaming conditions than direct firing, if introduction of steam in the oven is desired. Prior oven constructions do not lend themselves to convenient conversion from direct to indirect heating, and vice versa.

A further object of my invention is to provide an oven provided with a dual heating system adapted for selective direct or indirect heating wherein the change from direct to indirect heating and vice versa is accomplished instantaneously in a simple and convenient manner.

Another object is to provide an improved oven of the type described wherein direct and indirect heating is effected by means of a single source of heat and in which a single blower may be employed.

Another object is to provide an improved oven construction of the type described wherein even distribution of heating gases to the baking chamber is effected.

Other objects and advantages of the invention will be apparent from the following description, taken in connection with the accompanying drawings, in which Figure 1 is a horizontal sectional view of the oven taken through the baking chamber thereof;

Figure 1:
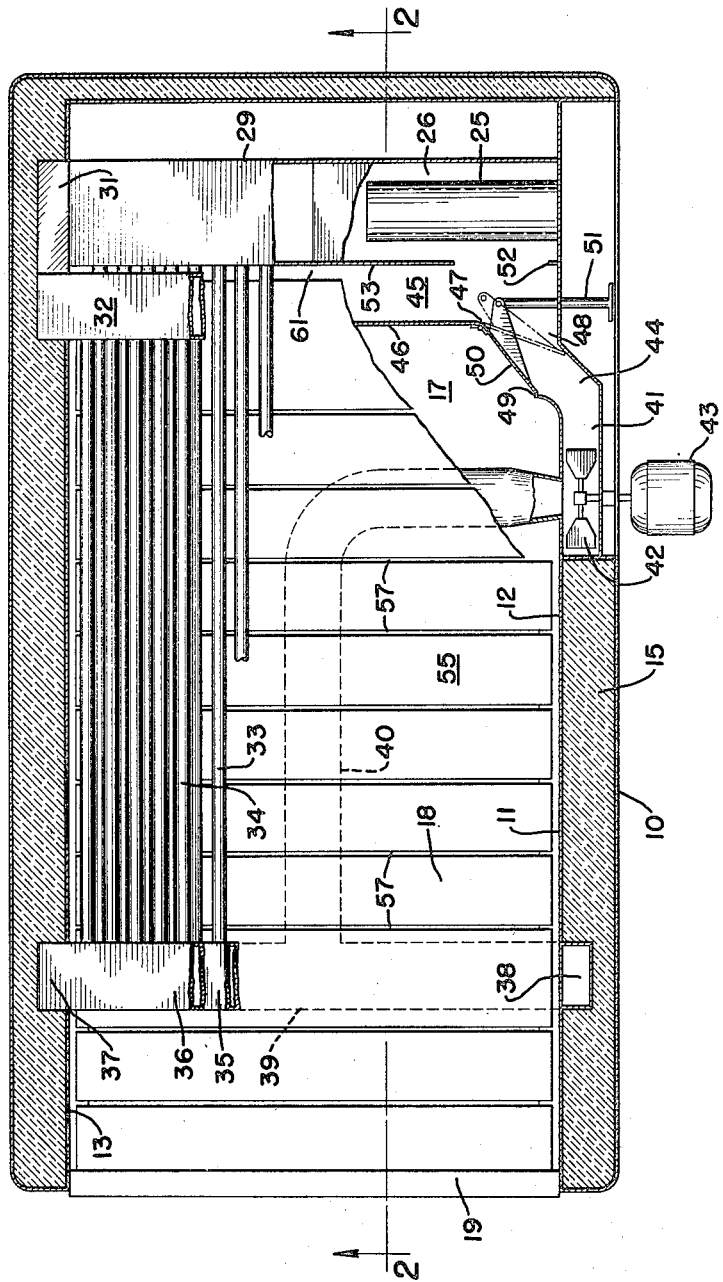

Referring now to the drawings, the reference character 10 denotes an outer housing of my improved oven, which housing is of generally rectangular shape and preferably formed of sheet metal supported and reinforced in suitable and well known manner, not shown. A generally similar inner housing 11, including side walls 12 and 13, defines a large chamber 14, and interposed between the walls of the inner and outer housings of the oven is suitable heat insulating material 15. The chamber 14 is divided into an upper baking chamber 16 and a lower heating gas distributing chamber 17 by a horizontal partition 18, hereinafter described in more detail.

The forward end of the oven is provided with an opening 19 permitting introduction into the baking chamber 16 of products to be baked. A slidable door 20 of conventional form is adapted to provide a closure for the opening 19.

Figure 2:
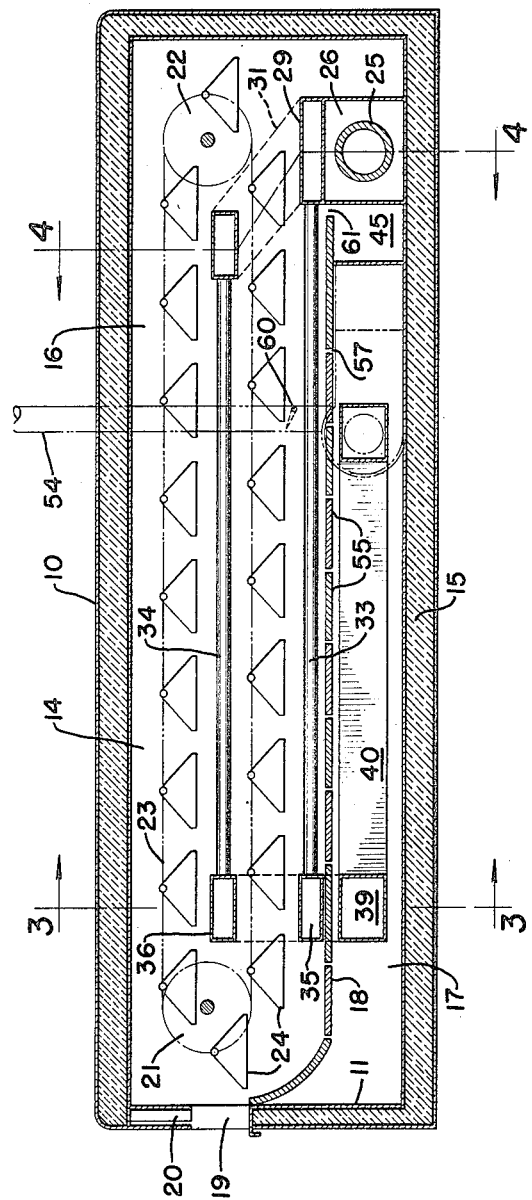
Figure 2 is a vertical longitudinal sectional view through the oven taken on the line 2—2 of Figure 1.

Mounted to extend longitudinally within the baking chamber 16 is a horizontally disposed endless conveyor of conventional form, illustrated somewhat diagrammatically in Figure 2. The conveyor includes a pair of transversely spaced apart sprocket wheels 21 at the forward end of the baking chamber 16, and a pair of similarly spaced sprocket wheels 22 at the rearward end thereof, over which sprocket wheels are trained suitable chains, indicated diagrammatically at 23. From the chains 23 are pivotally suspended the transversely extending trays 24 adapted to always assume an upright supporting position to receive the pans containing the products to be baked during their travel through the baking chamber.

The novel and improved heating arrangement which constitutes the essence of the invention, includes a heating system for indirect heating of the oven and a system for direct heating thereof, with means for selectively controlling the oven for baking by indirect heating or direct heating, or by partial direct and partial indirect heating.

In the construction illustrated, the single burner unit for both heating systems, includes a tubular housing 25 extending transversely from the side wall 12 of the housing of the oven into a mixing chamber 26, which chamber is disposed transversely within the lower rearward portion of the oven and extends across the width thereof. At its outer end, the tubular housing 25 is provided with the nozzle 27 of an oil burner for the introduction of a combustible mixture of vaporized oil and air for combustion within the tubular housing 25. It is understood, of course, that the oil burner shown is merely for purpose of illustration and may be replaced by other suitable heating means, as a gas burner.

Figure 4:
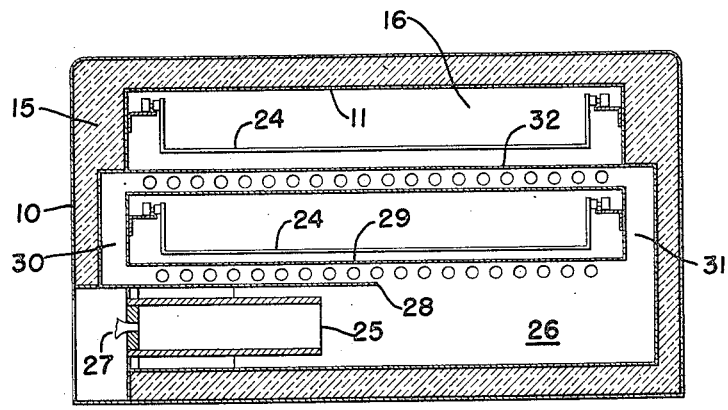
Figure 4 is a vertical transverse sectional view taken on the line 4—4 of Figure 2.

The mixing chamber 26 is provided in its top, at the side of the oven opposite the tubular housing 25, with an outlet 28 whereby the heated gases enter a lower rear header 29 extending transversely across the width of the oven below the level of the lower run of the trays 24. Extending upwardly and forwardly from the opposite ends of the header 29, are ducts 30 and 31, disposed respectively between the inner and outer walls of the opposite sides of the oven, as best shown in Figure 4. The upper ends of the ducts 30 and 31 communicate with the opposite ends of an upper rear header 32 which extends transversely across the width of the oven and is disposed between the upper and lower runs of the trays 24, immediately forward of the sprocket wheels 22, as shown in Figure 2.

Within the baking chamber 16, communicating with and extending horizontally forward of the headers 29 and 32 are lower and upper banks 33 and 34 of transversely spaced apart flues. At their forward ends the banks of heating tubes 33 and 34 communicate respectively with lower front header 35 and upper front header 36. The headers 35 and 36 extend transversely the width of the oven, with header 35 disposed between the lower run of the trays 24 and the partition 18 and the header 36 disposed between the upper and lower runs of the trays 24 immediately rearward of the sprocket wheels 21. While two horizontal rows of heating flues are shown in the drawing, it is readily apparent that a single horizontal row may be employed, though two rows are preferred.

Figure 3:
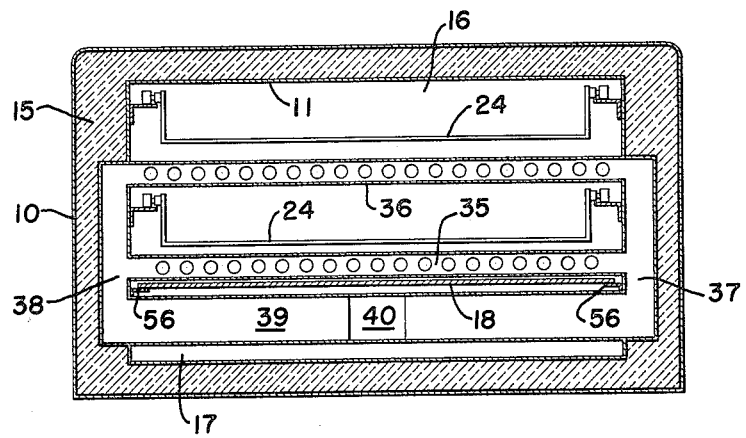
Figure 3 is a vertical transverse sectional view taken on the line 3—3 of Figure 2.

Extending downwardly from and in communication with the opposite ends of headers 35 and 36, are ducts 37 and 38, disposed respectively between the inner and outer walls of the opposite sides of the oven, as best shown in Figure 3. At their lower ends, the ducts 37 and 38 communicate with the opposite ends of return header 39, which extends transversely across the width of the oven within the heating gas distributing chamber 17.

A return flue 40 communicates with return header 39 and extends a distance rearwardly therefrom centrally between the sides of the oven, and then turns transversely of the oven to communicate with a blower casing 41 which is disposed between the inner wall 12 and the plane of the corresponding outer wall of the oven and houses a blower 42. The blower 42 is driven by an electric motor 43, disposed outside the oven housing.

The discharge end of the blower casing 14 communicates directly with a duct 44 extending rearwardly therefrom and inwardly of the oven, as shown in Figure 1. The duct 44 is open at its rearward inner end and is adapted for communication with the distributing chamber 17 and a chamber 45, immediately forward of mixing chamber 26. The front wall 53 of mixing chamber 26 forms the rear wall of chamber 45, and a vertical transversely extending wall 46, parallel with and spaced forward of wall 53 forms a front wall for the chamber 45. This wall 46 extends vertically between the partition 18 and the bottom wall 62 of the oven and separates the heating gas distributing chamber 17 from the chamber 45. The rearward portion of partition 18 forms a top wall for chamber 45 and is arranged to terminate short of the rear wall 53 to provide a vent 61 extending the width of the oven and providing for communication between the baking chamber 16 and the chamber 45, for a purpose later described. The vertical wall 46 connecting the partition 18 with the bottom wall of the oven extends transversely from the oven inner side wall 13 and terminates short of the oven inner side wall 12. There is thus formed between the end 47 of the wall 46 and the end of the outer wall of the duct 44 an opening 48 providing communication between the duct 44 and the chamber 45; and between the end 47 of the wall 46 and the end of the inner wall of the duct 44 an opening 49 providing communication between the duct 44 and the distributing chamber 17.

Hingedly mounted on the end 47 of the wall 46 is a damper 50 movable by means of a handle 51 to open or close the openings 48 and 49 to provide selective communication between the duct 44 and one or the other of chambers 17 and 45, or the damper may be moved to an intermediate position to provide communication between the duct 44 and both chambers 17 and 45. An opening 52 in the wall 53 which is common to the chambers 26 and 45, provides communication therebetween to permit recirculation of a desired portion of the heated gases during either direct or indirect heating, as hereinafter described.

With the damper positioned as shown in full lines in Figure 1, the oven is arranged for indirect heating. The heated gases resulting from combustion in the tubular housing 25 are discharged into the mixing chamber 26 from which they pass through outlet 28 into header 29 and through the ducts 30 and 31 into header 32. From the headers 29 and 32 the heated gases pass through the lower and upper banks of heating tubes 33 and 34 to the headers 35 and 36, during which passage of the heated gases, the baking chamber 16 is indirectly heated.

The gases pass from the headers 35 and 36 to the common return header 39 through the ducts 37 and 38, and from the header 39 through the return flue 40 to the intake side of the blower casing 41. Associated with the upper end of the blower casing 41 is a stack 54, which may be provided with a suitable damper 60 so as to permit discharging through said stack of a predetermined proportion of the heated return gases. The remainder of the heated gases are discharged by the blower 42 through the duct 44 into chamber 45 from whence they pass through the opening 52 into the mixing chamber 26 to be mixed with the high temperature combustion gases issuing from the tubular burner housing 25, and recirculated.

The oven is adapted for direct heating by simply manipulating the damper 50 to move it from the position shown in full lines in Figure 1 to the position shown in broken lines. In this position of damper 50, opening 48 from duct 44 to chamber 45 is closed and opening 49 from duct 44 to heating chamber 17 is opened whereby heated gases from the discharge side of the blower casing 41 are discharged through duct 44 into the heating gas distributing chamber 17 beneath the partition 18.

The partition 18 is formed of a plurality of horizontal plates 55 extending transversely across the width of the oven, and are supported in suitable manner, as by brackets 56 secured to the inner oven housing walls 12 and 13. The plates 55 are spaced slightly apart to provide a plurality of longitudinally spaced transversely extending narrow elongated vents 57 through which the heated gases pass from the chamber 17 into the baking chamber 16. The plurality of longitudinally spaced vents 57 provide for uniform heating of the baking chamber and provide for introduction of heated gases in the extreme front portion of the baking chamber 16 where the products to be baked are introduced into the oven through the opening 19. The vent 61 permits gases from the baking chamber 16 to enter the chamber 45 and pass through opening 52 into the mixing chamber 26 for recirculation with fresh combustion gases from the burner housing 25.

In ovens of the general type disclosed, for the purpose of producing certain characteristics in the crust or exposed portions of the loaves of bread, it may be desirable to supply a small quantity of live steam into the baking chamber. This may be done in any suitable manner, as by conduits 62 in the upper portion of the baking chamber above the upper run of the trays 24.

It is apparent that the invention provides an oven permitting great flexibility in operation, affording the baker a choice of direct heating or indirect heating or a combination of direct and indirect heating whereby various types of products may be baked under the most desirable conditions.

I claim:

1. In a baking oven, a partition dividing the oven into an upper baking chamber and a lower hot gas distributing chamber, means for indirectly heating said baking chamber including a source of hot gases and flues for conducting the hot gases through the baking chamber, means for conducting said hot gases from said flues after having passed therethrough, said last means having a communicating opening with said distributing chamber for admitting thereto the hot gases coming from said flues, said partition having a plurality of vents for admitting said hot gases from said distributing chamber directly into said baking chamber for directly heating the same, and valve means for said opening operative for selectively admitting or interrupting admission of the hot gases coming from said flues into said distributing chamber.

2. In a baking oven, a partition dividing the oven into an upper baking chamber and a lower hot gas distributing chamber, means for indirectly heating said baking chamber including a source of hot gases and flues for conducting the hot gases through the baking chamber, means for conducting said hot gases from said flues after having passed therethrough, said last means having a communicating opening with said distributing chamber for admitting thereto the hot gases coming from said flues, said partition having a plurality of longitudinally spaced slots extending substantially the width of said oven for admitting said hot gases from said distributing chamber directly into said baking chamber for directly heating the same, and valve means for said opening operative for selectively admitting or interrupting admission of the hot gases coming from said flues into said distributing chamber.

3. In a baking oven, a hot gas supply chamber, a partition providing in said oven an upper baking chamber and a lower hot gas distributing chamber, flues leading from said supply chamber through said baking chamber for indirectly heating the same, return duct means for said hot gas leading from said flues to said supply chamber, said duct means having a communicating opening with said distributing chamber, valve means for controlling the relative amount of returning hot gases delivered through said opening from said duct means to said distributing chamber with respect to the amount delivered to said supply chamber from said duct means, and a plurality of vents in said partition for passage of returning hot gases from said distributing chamber into said baking chamber for directly heating the same.

4. In a baking oven, a partition dividing the oven into an upper baking chamber and a lower hot gas distributing chamber, means for indirectly heating said baking chamber including a source of hot gases and flues for conducting the hot gases through the baking chamber, return means for conducting said hot gases from said flues after having passed therethrough, said return means having a communicating opening with said distributing chamber for admitting returning hot gases to the distributing chamber, a power actuated suction-blower interposed in said return conducting means for withdrawing hot gases from said flues and blowing hot gases into said distributing chamber, said partition having a plurality of vents for admitting said returning hot gases from said distributing chamber directly into said baking chamber for directly heating the same, and valve means for said opening operative for selectively admitting or interrupting admission of returning hot gases into said distributing chamber.

5. In a baking oven, a hot gas supply chamber, a partition providing in said oven an upper baking chamber and a lower hot gas distributing chamber, flues leading from said supply chamber through said baking chamber for indirectly heating the same, return duct means leading from said flues to said supply chamber adapted to recirculate hot gases, said duct means having a communicating opening with said distributing chamber, valve means in said duct means adapted to divert hot gases to said distributing chamber, said partition having vents for passage of hot gases from said distributing chamber into said baking chamber, and vent means providing communication between said baking chamber and said duct means adapted for recirculation of hot gases from said baking chamber.

6. In a baking oven, a hot gas supply chamber, a partition providing in said oven an upper baking chamber and a lower hot gas distributing chamber, flues leading from said supply chamber through said baking chamber for indirectly heating the same, return duct means leading from said flues to said supply chamber adapted to recirculate hot gases, said duct means having a communicating opening with said distributing chamber, valve means in said duct means adapted to divert hot gases to said distributing chamber, said partition having vents for passage of hot gases from said distributing chamber into said baking chamber, and vent means along the full width of said oven providing communication between said baking chamber and said duct means adapted for recirculation of hot gases from said baking chamber.

7. In a heating system for the baking chamber of an oven, a source of combustion gases, flues extending from said source through said baking chamber for conducting combustion gases in indirect heat transfer relation with the products to be baked, a return duct for returning combustion gases from said flues, a chamber connecting said duct to said source, a suction-blower in said system for maintaining circulation of said combustion gases, means including a vent in said return duct providing a passage from said return duct direct to said baking chamber for conducting only returning combustion gases thereto for direct heating of said baking chamber solely by returning combustion gases, and valve means controlling said vent and said return duct for effecting discharge of returning combustion gases selectively to said baking chamber and said source.

8. In a heating system for the baking chamber of an oven, a source of combustion gases, flues extending from said source through said baking chamber for indirectly heating the entire baking chamber, a return duct for returning combustion gases from said flues, a chamber connecting said duct to said source, a suction-blower in said system for maintaining circulation of said combustion gases, means including a vent in said return duct providing a passage from said return duct direct to the bottom of said baking chamber for conducting only returning combustion gases thereto for direct heating of the entire baking chamber solely by returning combustion gases, and valve means controlling said vent and said return duct for effecting discharge of returning combustion gases selectively to said baking chamber and said source.

9. In a heating system for the baking chamber of an oven provided with an endless traveling conveyor for transporting products to be baked through said baking chamber, a source of combustion gases, flues in the baking chamber, duct means connecting said source of combustion gases and said flues in a closed circuit for indirectly heating said baking chamber, a blower for circulating the combustion gases through said circuit, means including a vent in said duct means between the outlet of said flues and said source providing a passage from said duct means direct to said baking chamber below the level of the entire product transporting surface of said conveyor for conducting only returning combustion gases thereto for direct heating of the baking chamber solely by returning combustion gases, and a damper for said vent for selectively admitting only the returning combustion gases into said baking chamber for directly heating the same and for interrupting admission of returning combustion gases to said baking chamber without interruption of flow of combustion gases through said circuit for indirect heating of said baking chamber.

10. In a heating system for the baking chamber of an oven provided with an endless traveling conveyor for transporting products to be baked through said baking chamber, a source of combustion gases, flues extending from said source through said baking chamber, for conducting combustion gases therethrough for indirectly heating said baking chamber, a duct communicating with the discharge end of said flues for carrying the combustion gases therefrom, said return duct extending through the lower portion of said oven, a suction-blower for circulating said combustion gases, a vent in said duct communicating with said baking chamber below the level of the entire product transporting surface of said conveyor, and a damper for said vent for selectively admitting only combustion gases coming from said flues into said baking chamber for directly heating the same and for interrupting admission of said combustion gases coming from said flues to said baking chamber without interruption of flow of combustion gases through said system for indirect heating of said baking chamber.

References Cited in the file of this patent

UNITED STATES PATENTS

| | | |
|---|---|---|
| 940,559 | Schoenhar | Nov. 16, 1909 |
| 1,664,443 | Williams et al. | Apr. 3, 1928 |
| 1,790,876 | Mueller | Feb. 3, 1931 |
| 1,890,681 | Hoppe | Dec. 13, 1932 |